(12) United States Patent
Hester

(10) Patent No.: US 10,615,678 B2
(45) Date of Patent: Apr. 7, 2020

(54) MAGNETIC PROPULSION ENGINE

(71) Applicant: David Lee Hester, Grambling, LA (US)

(72) Inventor: David Lee Hester, Grambling, LA (US)

(*) Notice: Subject to any disclaimer, the term of this patent is extended or adjusted under 35 U.S.C. 154(b) by 70 days.

(21) Appl. No.: 16/038,671

(22) Filed: Jul. 18, 2018

(65) Prior Publication Data

US 2019/0028011 A1 Jan. 24, 2019

Related U.S. Application Data

(60) Provisional application No. 62/534,328, filed on Jul. 19, 2017.

(51) Int. Cl.
| | |
|---|---|
| *H02K 33/16* | (2006.01) |
| *H02K 33/10* | (2006.01) |
| *B60K 6/26* | (2007.10) |
| *H02J 7/02* | (2016.01) |
| *H02K 49/10* | (2006.01) |
| *H02K 33/14* | (2006.01) |

(52) U.S. Cl.
CPC ............... *H02K 33/10* (2013.01); *B60K 6/26* (2013.01); *H02J 7/025* (2013.01); *H02K 33/14* (2013.01); *H02K 33/16* (2013.01); *H02K 49/102* (2013.01)

(58) Field of Classification Search
CPC .......................................... H02K 33/00–33/18
See application file for complete search history.

(56) References Cited

U.S. PATENT DOCUMENTS

| | | |
|---|---|---|
| 5,253,592 A | 10/1993 | Coffey |
| 5,605,100 A | 2/1997 | Morris |
| 6,193,194 B1 | 2/2001 | Minovitch |
| 6,827,022 B2 | 12/2004 | Van Den Bergh |
| 7,777,377 B2 | 8/2010 | Tkadlec |
| 8,011,995 B1 | 9/2011 | Todd |
| 8,528,486 B2 | 9/2013 | Lee |
| 9,118,221 B2 | 8/2015 | Tkadlec |
| 2012/0169147 A1 | 7/2012 | Kirma |
| 2015/0022031 A1 | 1/2015 | Ensle |

*Primary Examiner* — Ramon M Barrera
(74) *Attorney, Agent, or Firm* — Greg N. Geiser; Gutwein Law

(57) ABSTRACT

An assembly configured to generate a propulsive force through a plurality of magnets. The assembly includes a rod having a center disk comprised of non-magnetic materials and configured to receive an electromagnet and a plurality of coaxial magnetic disks configured for selective movement about the rod when a magnetic field is generated by the electromagnet.

9 Claims, 8 Drawing Sheets

MAGNETIC PROPULSION ENGINE

CROSS REFERENCE TO RELATED APPLICATIONS

This application claims priority to U.S. Provisional Patent Application No. 62/534328 filed 19 Jul. 2017 to the above named inventor, and is herein incorporated by reference in its entirety.

FEDERALLY SPONSORED RESEARCH OR DEVELOPMENT

Not Applicable

SEQUENCE LISTING, A TABLE, OR A COMPUTER PROGRAM

Not Applicable

FIELD OF THE INVENTION

The disclosure of the present application relates generally to a magnetic propulsion assembly configured to operate as an engine for powering a device for the purpose of flight analogous to air flow lift force underneath a wing except using a magnetic field.

BACKGROUND

Currently there are a number of solutions for use as a fuel source generally configured to aid in the production of a power in the propulsion of a device, such as a vehicle. The typical fuel source is a hydrocarbon based fuel that is burned to create combustion for generally powering an engine to generate a propulsion. The use of hydrocarbon based fuels is generally not preferred as combustion may result in the dispersal of combusted pollutants into the atmosphere.

Another alternate fuel source for use in the generation of a power is the collection of solar energy through a photovoltaic cell and configured for storage within a battery. The use of solar energy is generally not preferred as a main power source as the level of solar energy varies throughout the seasons and hemispheres.

Due to the limitations of these alternate fuel sources, there is a desire within the marketplace for an improved power source that does not produce harmful carbon based emissions. Preferably, this power source does not require the use of an external propellant and utilizes a magnetic force for generating a propulsive force.

SUMMARY OF THE INVENTION

The apparatus of the present disclosure generally utilizes magnetic forces for propulsion. The magnetic forces of the apparatus are configured to provide propulsion without polluting the environment through carbon based emissions. Still further, the apparatus of the present disclosure is configured to provide a cleaner and more environmentally friendly form of propulsion.

The invention advantageously fills the aforementioned deficiencies by providing a magnetic propulsion engine, which provides an enclosed, self-generating propulsive force for the movement of an object or vehicle.

The present disclosure is generally comprised of three or more coaxial magnets positioned on a non-magnetic axis rod. The apparatus of the disclosure has the ability to adjust to various body shapes and sizes to fit the various engine needs of a given vehicle. Accordingly, the magnetic propulsion engine apparatus can be placed in the same general compartment area of the vehicle to which it will be attached as the occupants of the vehicle (which may include an operator, passenger(s), and/or cargo) where all of the included will be protected from exposure to the elements of any external environmental conditions outside of the vehicle, since the magnetic engine does not produce any harmful exhaust coming from the engine itself.

The apparatus of the present disclosure further includes a magnetic wing assembly configured to provide the magnetic force that provides the lift and propulsive force to generally move the vehicle.

The apparatus assembly includes a plurality of insulating spacers generally provided to allow for proper function of the device.

The drawings of the present disclosure generally depict a spherical enclosure which is provided to represent an arbitrary vehicle body that the magnetic engine of the present disclosure may be placed within and is provided for presentation purposes only. It is not part of the invention itself.

The invention of the present disclosure will now will be described more fully hereinafter with reference to the accompanying drawings, which are intended to be read in conjunction with both this summary, the detailed description and any preferred and/or particular embodiments specifically discussed or otherwise disclosed. This invention may, however, be embodied in many different forms and should not be construed as limited to the embodiments set forth herein; rather, these embodiments are provided by way of illustration only and so that this disclosure will be thorough, complete and will fully convey the full scope of the invention to those skilled in the art.

DETAILED DESCRIPTION OF THE INVENTION

Figure 1:
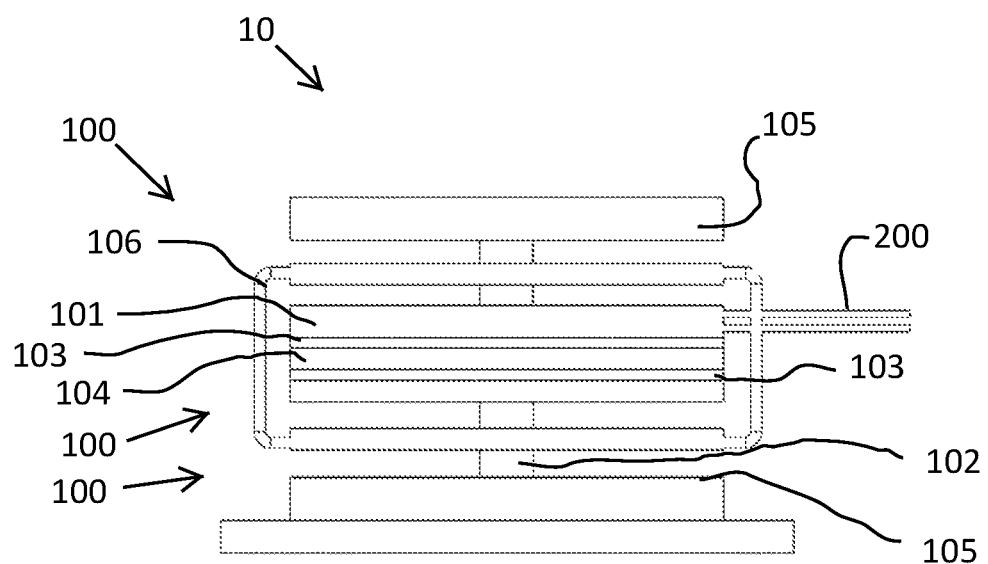
FIG. 1 shows the left side of the device, according to the present disclosure.
Figure 2:
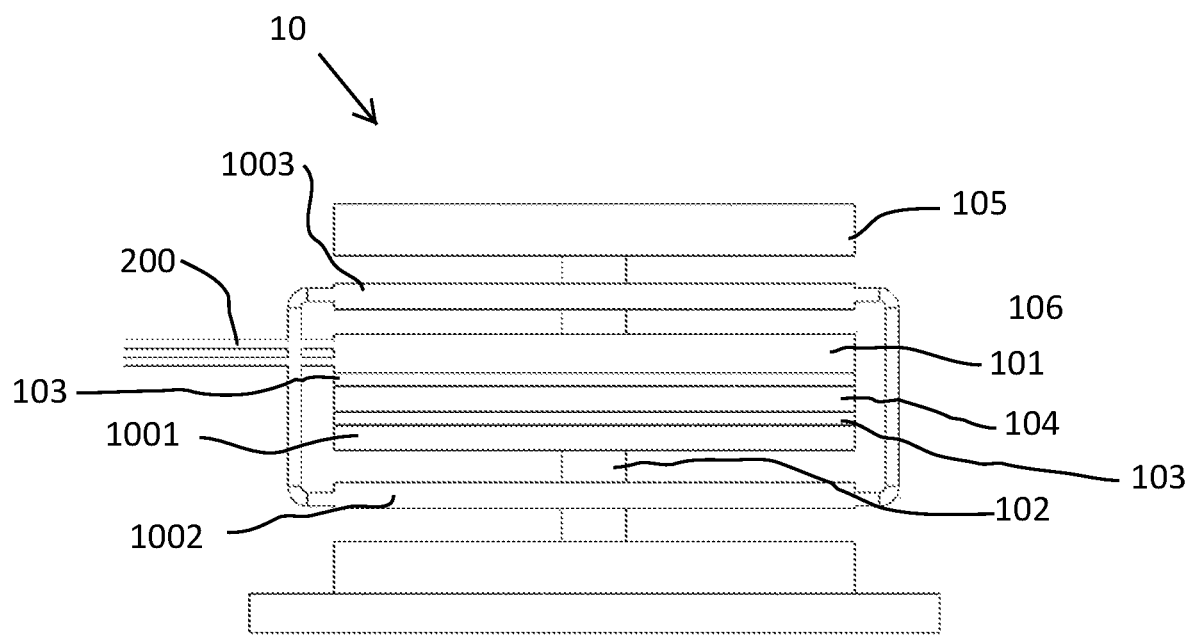
FIG. 2 shows the right side of the device, according to the present disclosure.
Figure 3:
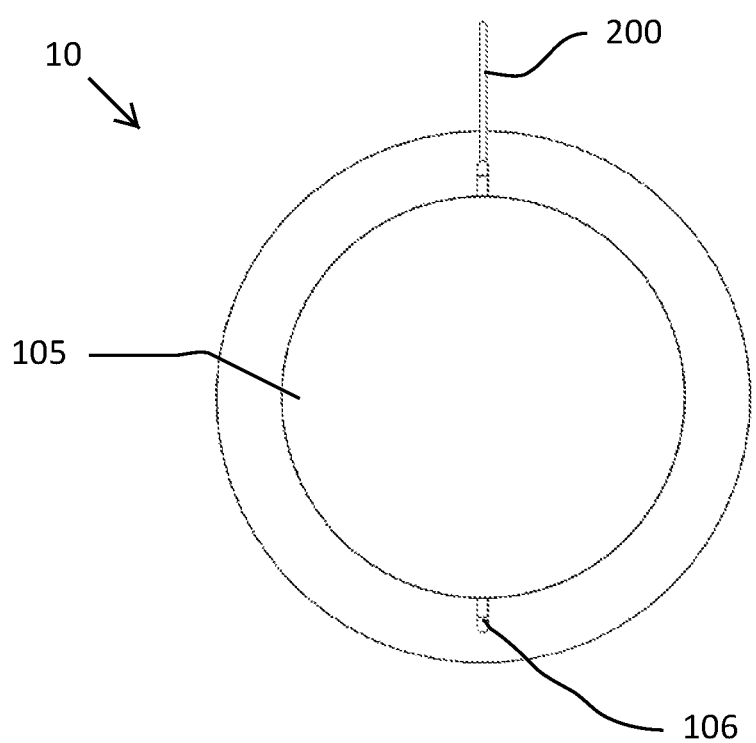
FIG. 3 shows the top of the device, according to the present disclosure.
Figure 4:
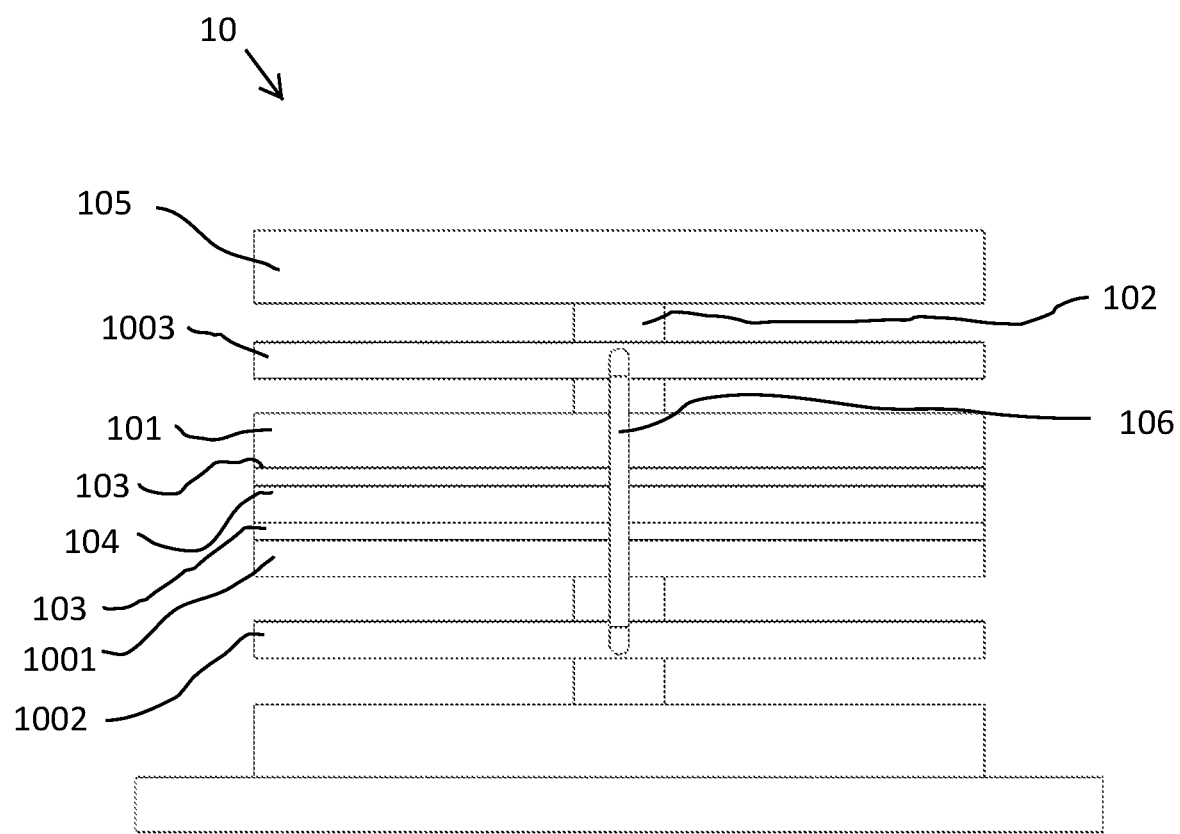
FIG. 4 shows the front of the device, according to the present disclosure.
Figure 5:
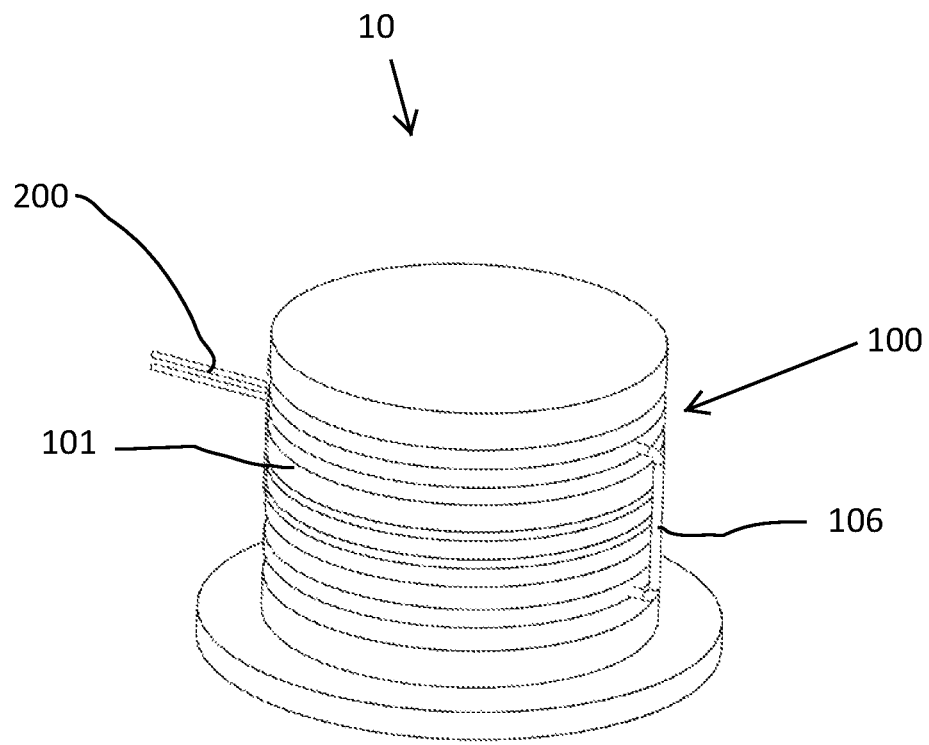
FIG. 5 shows the perspective of the device, according to the present disclosure.
Figure 6:
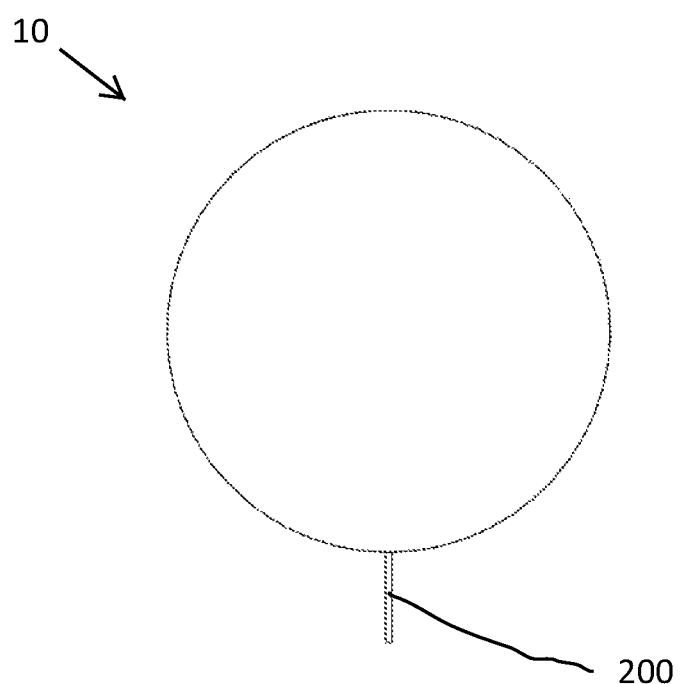
FIG. 6 shows the bottom of the device, according to the present disclosure.
Figure 7:
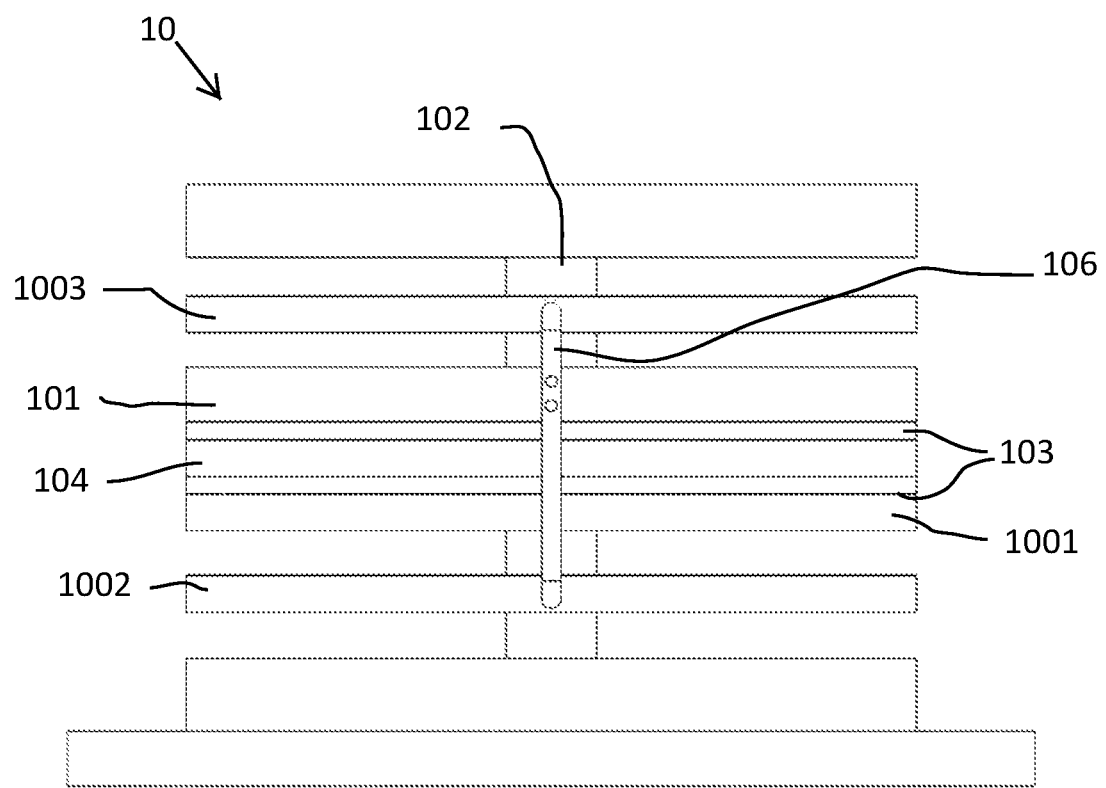
FIG. 7 shows the back of the device, according to the present disclosure.

The following detailed description includes references to the accompanying drawings, which forms a part of the detailed description. The drawings show, by way of illustration, specific embodiments in which the invention may be practiced. These embodiments, which are also referred to herein as "examples," are described in enough detail to enable those skilled in the art to practice the invention. The embodiments may be combined, other embodiments may be utilized, or structural, and logical changes may be made without departing from the scope of the present invention. The following detailed description is, therefore, not to be taken in a limiting sense.

Before the present invention is described in such detail, however, it is to be understood that this invention is not limited to particular variations set forth and may, of course, vary. Various changes may be made to the invention described and equivalents may be substituted without departing from the true spirit and scope of the invention. In addition, many modifications may be made to adapt a particular situation, material, composition of matter, process, process act(s) or step(s), to the objective(s), spirit or scope of the present invention. All such modifications are intended to be within the scope of the disclosure made herein.

Unless otherwise indicated, the words and phrases presented in this document have their ordinary meanings to one of skill in the art. Such ordinary meanings can be obtained by reference to their use in the art and by reference to general and scientific dictionaries.

References in the specification to "one embodiment" indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The following explanations of certain terms are meant to be illustrative rather than exhaustive. These terms have their ordinary meanings given by usage in the art and in addition include the following explanations.

As used herein, the term "and/or" refers to any one of the items, any combination of the items, or all of the items with which this term is associated.

As used herein, the singular forms "a," "an," and "the" include plural reference unless the context clearly dictates otherwise.

As used herein, the terms "include," "for example," "such as," and the like are used illustratively and are not intended to limit the present invention.

As used herein, the terms "preferred" and "preferably" refer to embodiments of the invention that may afford certain benefits, under certain circumstances. However, other embodiments may also be preferred, under the same or other circumstances.

Furthermore, the recitation of one or more preferred embodiments does not imply that other embodiments are not useful, and is not intended to exclude other embodiments from the scope of the invention.

As used herein, the terms "front," "back," "rear," "upper," "lower," "right," and "left" in this description are merely used to identify the various elements as they are oriented in the FIGS, with "front," "back," and "rear" being relative to the apparatus. These terms are not meant to limit the elements that they describe, as the various elements may be oriented differently in various applications.

As used herein, the term "coupled" means the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature.

The invention of the present disclosure is a magnetic propulsion based engine.

The disclosure of the present invention is a three or more coaxial disk magnet and electromagnet on a non-magnetic axis rod provided in an assembly and configured to generate a propulsion force.

Referring to the figures, FIGS. 1-8 show the various views of the magnetic propulsion engine according to the present invention and generally referred to as device 10. The device 10 is configured to use a magnetic field, generated from an electromagnet 101, to provide a propulsion force to generally lift an object the device 10 is placed within. The device 10 within the present disclosure is generally depicted with its minimum components and wherein the device 10 can be provided in series, duplicate, or assemblies with in an increase in the number or size of the components of the device 10 generally enabled and configured to provide the necessary propulsive force to power the various systems and vehicles the device 10 is placed within.

Accordingly, the device 10 utilizes an assembly, herein referred to as a magnetic wing, comprising at least three or more coaxial magnets 100 having the shape of a disk and in a spatial assembly positioned in a magnetic coupling with the electromagnet 101 and received upon a non-magnetic axis rod 102. The coaxial magnets 100 and electromagnet 101 generally having an aperture for receipt on the rod 102, wherein the coaxial magnets 100 are configured to move about the rod 102 upon a directed magnetic field from a current that is applied to the electromagnet 101.

The electromagnet 101 is configured to receive electrical power from a power source 200, such as a battery, to create a magnetic field within the electromagnet 101 received upon the non-magnetic axis rod 102 and configured in a selective magnetic coupling with the coaxial magnets 100 of the device 10.

The non-magnetic axis rod 102 includes a center non-magnetic disk 104 in a fixed central position about the rod 102. Positioned upon each of an upper side and a lower side of the center non-magnetic disk 104 is a plurality of non-magnetic insulating pads 103. The non-magnetic insulating pads 103 configured to insulate and provided a space between the magnetic field of the electromagnet 101 at least one of the coaxial magnets 100.

Additional coaxial disk magnets 100 are positioned both above and below the center disk 104 and configured to move together along on the axis rod 102. The additional coaxial disk magnets 100 are in a fixed coupling with each other through a non-magnetic brace 106, wherein the coaxial disk magnets 100 are configured for selective movement through a magnetic force generated by the electromagnet 101.

In the preferred assembly of the present disclosure, the device 10 is comprised of three coaxial disk magnets 100 with a first coaxial disk magnet 1001 positioned on the lower side of the center disk 104, wherein at least one non-magnetic insulating pad 103 is positioned between the center disk 104 and the first coaxial disk magnet 1001. A second coaxial disk magnet 1002 is positioned a distance away from the first coaxial disk magnet 1001, wherein the distance defines a gap between the first disk magnet 1001 and second disk magnet 1002. A third coaxial disk magnet 1003 is coupled to the second coaxial disk magnet 1002 through the brace 106 and positioned on the upper side of the center disk 104 above the electromagnet 101 a distance, wherein the distance defines a gap between the electromagnet 101 and third coaxial disk magnet 1003 and generally opposed the second coaxial disk magnet 1002.

Figure 8:
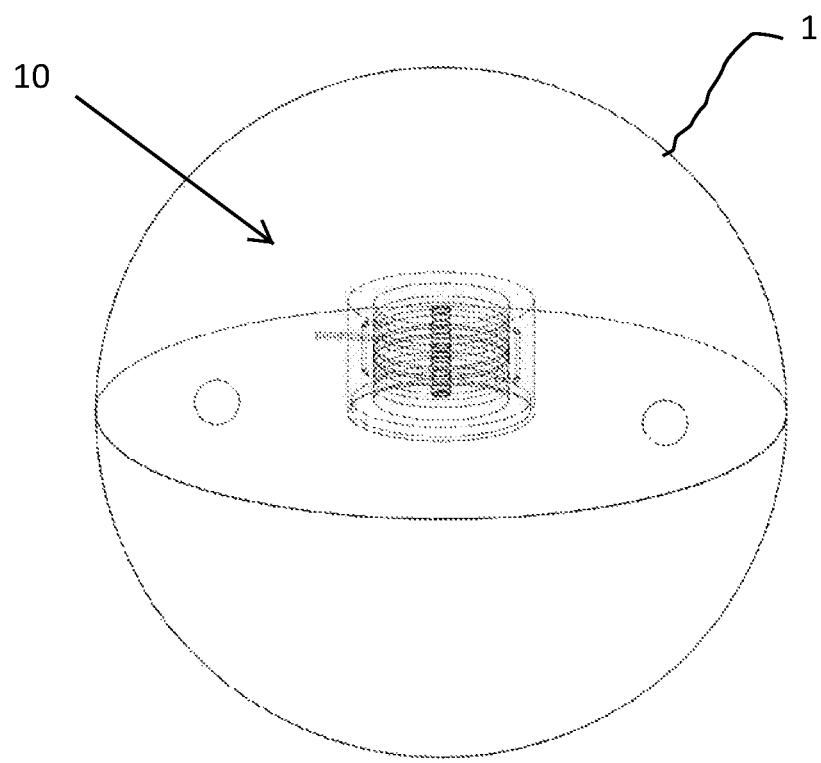
FIG. 8 shows the assembly of the device.

The magnetic wing assembly of the present disclosure is generally shown inside a cylindrical housing (other housings may be utilized) with the axis rod 102 having ends placed within center apertures in the disks 100 within an enclosure 105 to hold the concentric magnets centered in place. Accordingly the device 10 can be placed into a multitude of housings or cavities for generally providing the propulsion of a vehicle with one such assembly represented as a sphere 1 (FIG. 8).

While the invention has been described above in terms of specific embodiments, it is to be understood that the invention is not limited to these disclosed embodiments. Upon reading the teachings of this disclosure many modifications and other embodiments of the invention will come to mind of those skilled in the art to which this invention pertains, and which are intended to be and are covered by both this disclosure and the appended claims. It is indeed intended that the scope of the invention should be determined by proper interpretation and construction of the appended claims and their legal equivalents, as understood by those of skill in the art relying upon the disclosure in this specification and the attached drawings.

The invention claimed is:

1. An engine configured to generate a propulsion force, the engine comprising:
    a rod, the rod comprised of material that is not magnetic;
    a center disk, the center disk positioned on a central position about a length of the rod, the center disk comprised of a material that is not magnetic and having an upper side and a lower side;
    an electromagnet, the electromagnet configured to selectively generate a magnetic field and positioned on the upper side of the center disk along the rod;
    a first coaxial disk magnet, the first coaxial disk magnet comprised of a magnetic material and positioned about the rod at a position adjacent to the lower side of the center disk;
    a second coaxial disk magnet, the second coaxial disk magnet positioned about the rod at a position opposed the first coaxial disk magnet a distance opposite the lower side, wherein there is a gap between the first coaxial disk magnet and the second coaxial disk magnet;
    a third coaxial disk magnet, the third coaxial disk magnet positioned about the rod at a position opposed the electromagnet a distance opposite the upper side, wherein there is a second gap between the electromagnet and the third coaxial disk magnet; and
    a brace, the brace comprised of a non-magnetic material and connecting the second coaxial disk magnet and the third coaxial disk magnet, wherein the second coaxial disk magnet and third coaxial disk magnet are configured for movement about the rod upon generation of the magnetic field of the electromagnet.

2. An engine as in claim 1, wherein the engine comprises a first non-magnetic insulating pad, the first non-magnetic insulating pad positioned between the upper side of the center disk and a lower side of the electromagnet.

3. An engine as in claim 2, wherein the engine comprises a second non-magnetic insulating pad, the second non-magnetic insulating pad positioned between the lower side of the center disk and an upper side of the first coaxial magnet.

4. An engine as in claim 3, wherein the first coaxial disk magnet, the second coaxial disk magnet, and the third coaxial disk magnet each have an aperture, the aperture sized and shaped to receive the rod, wherein the magnets are received on the rod and configured for movement about the rod.

5. A assembly configured to generate a propulsive force and operating as an engine, the assembly comprising:
    a rod, the rod comprised of material that is not magnetic;
    a center disk, the center disk positioned on a central position about a length of the rod, the center disk comprised of a material that is not magnetic and having an upper side and a lower side;
    an electromagnet, the electromagnet configured to selectively generate a magnetic field and positioned on the upper side of the center disk along the rod;
    a first coaxial disk magnet, the first coaxial disk magnet comprised of a magnetic material and positioned about the rod at a position adjacent to the lower side of the center disk;
    a second coaxial disk magnet, the second coaxial disk magnet positioned about the rod at a position opposed the first coaxial disk magnet a distance opposite the lower side, wherein there is a gap between the first coaxial disk magnet and the second coaxial disk magnet;
    a third coaxial disk magnet, the third coaxial disk magnet positioned about the rod at a position opposed the electromagnet a distance opposite the upper side, wherein there is a second gap between the electromagnet and the third coaxial disk magnet;
    a first non-magnetic insulating pad, the first non-magnetic insulating pad positioned between the upper side of the center disk and a lower side of the electromagnet; and
    a brace, the brace comprised of a non-magnetic material and connecting the second coaxial disk magnet and the third coaxial disk magnet, wherein the second coaxial disk magnet and third coaxial disk magnet are configured for movement about the rod upon generation of the magnetic field of the electromagnet.

6. An assembly as in claim 5, wherein the assembly comprises a second non-magnetic insulating pad, the second non-magnetic insulating pad positioned between the lower side of the center disk and an upper side of the first coaxial magnet.

7. An assembly as in claim 5, wherein the first coaxial disk magnet, the second coaxial disk magnet, and the third coaxial disk magnet each have an aperture, the aperture sized and shaped to receive the rod, wherein the magnets are received on the rod and configured for movement about the rod.

8. A assembly configured to generate a propulsive force and operating as an engine, the assembly comprising:
    a rod, the rod comprised of material that is not magnetic;
    a center disk, the center disk positioned on a central position about a length of the rod, the center disk comprised of a material that is not magnetic and having an upper side and a lower side;
    an electromagnet, the electromagnet configured to selectively generate a magnetic field and positioned on the upper side of the center disk along the rod;
    a first coaxial disk magnet, the first coaxial disk magnet comprised of a magnetic material and positioned about the rod at a position adjacent to the lower side of the center disk;
    a second coaxial disk magnet, the second coaxial disk magnet positioned about the rod at a position opposed the first coaxial disk magnet a distance opposite the lower side, wherein there is a gap between the first coaxial disk magnet and the second coaxial disk magnet;

a third coaxial disk magnet, the third coaxial disk magnet positioned about the rod at a position opposed the electromagnet a distance opposite the upper side, wherein there is a second gap between the electromagnet and the third coaxial disk magnet;

a first non-magnetic insulating pad, the first non-magnetic insulating pad positioned between the upper side of the center disk and a lower side of the electromagnet;

a second non-magnetic insulating pad, the second non-magnetic insulating pad positioned between the lower side of the center disk and an upper side of the first coaxial magnet; and a brace, the brace comprised of a non-magnetic material and connecting the second coaxial disk magnet and the third coaxial disk magnet, wherein the second coaxial disk magnet and third coaxial disk magnet are configured for movement about the rod upon generation of the magnetic field of the electromagnet.

9. An assembly as in claim 8, wherein the first coaxial disk magnet, the second coaxial disk magnet, and the third coaxial disk magnet each have an aperture, the aperture sized and shaped to receive the rod, wherein the magnets are received on the rod and configured for movement about the rod.

\* \* \* \* \*